United States Patent
Subramanian et al.

(10) Patent No.: US 10,567,915 B2
(45) Date of Patent: Feb. 18, 2020

(54) SYSTEM AND METHODS OF SEARCHING FOR AN OBJECT USING HYPER-LOCAL LOCATION TECHNIQUES

(71) Applicant: WALGREEN CO., Deerfield, IL (US)

(72) Inventors: Kartik Subramanian, Chicago, IL (US); Benjamin Weiss, Chicago, IL (US); Shivakumar Chandramouli, Schaumburg, IL (US); Viral Brahmbhatt, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 15/996,648

(22) Filed: Jun. 4, 2018

(65) Prior Publication Data
US 2019/0373412 A1 Dec. 5, 2019

(51) Int. Cl.
*H04W 4/024* (2018.01)
*G06Q 30/06* (2012.01)
*H04W 4/33* (2018.01)

(52) U.S. Cl.
CPC ........ *H04W 4/024* (2018.02); *G06Q 30/0639* (2013.01); *G06Q 30/0643* (2013.01); *H04W 4/33* (2018.02)

(58) Field of Classification Search
CPC ......... H04W 4/50; H04W 4/046; H04W 4/40; H04W 4/025; G06Q 30/0207; G06Q 30/0226; G06Q 30/0267; G06Q 30/0269; G06Q 30/06; G06Q 30/0601; G06Q 30/0633; G06Q 30/0641
See application file for complete search history.

(56) References Cited

U.S. PATENT DOCUMENTS

| | | | |
|---|---|---|---|
| 9,779,603 B1 | 10/2017 | Subramanian et al. | |
| 2012/0284105 A1* | 11/2012 | Li | G06Q 30/02 705/14.23 |
| 2014/0214547 A1* | 7/2014 | Signorelli | G06Q 30/0267 705/14.64 |
| 2015/0221010 A1 | 8/2015 | Ming | |
| 2015/0242922 A1 | 8/2015 | Zamer | |
| 2015/0324863 A1* | 11/2015 | Pugh | G06Q 30/0226 705/14.27 |
| 2016/0358168 A1* | 12/2016 | Van Os | G06Q 20/40 |

OTHER PUBLICATIONS

European Patent Application No. 19177742.4, Extended European Search Report, dated Oct. 22, 2019.

* cited by examiner

*Primary Examiner* — Diane D Mizrahi
(74) *Attorney, Agent, or Firm* — Marshall, Gerstein & Borun LLP; Randall G. Rueth

(57) ABSTRACT

Embodiments are provided for enhancing an in-store retail experience for a customer by providing information relevant to objects and services using hyper-local location techniques to facilitate identification of objects and services available for sale in a premise. According to certain aspects, an electronic device may determine a location of the electronic device and generate object capture information based on detecting the object or service at the physical premise by a viewfinder of the electronic device. The electronic device may display, on an interface, notification information particular to the object or service corresponding to the location and object capture information.

17 Claims, 8 Drawing Sheets

SYSTEM AND METHODS OF SEARCHING FOR AN OBJECT USING HYPER-LOCAL LOCATION TECHNIQUES

FIELD OF DISCLOSURE

This application generally relates to enhancing a retail experience for a customer. In particular, this application relates to providing information relevant to objects available for sale within a premise using hyper-local location techniques.

BACKGROUND

Portable electronic devices such as smart phones and tablet devices are becoming more ubiquitous as underlying technology and device capability improves. These devices incorporate numerous components that support various device functions and applications. For example, current smart phones include components that enable network connections as well as location modules capable of detecting device location.

Certain technologies exist to assist customers during a retail shopping experience. For example, customers may maintain account information using device applications, and complete point of sale transactions using device hardware (e.g., near field communication technology).

However, existing technologies do not support certain situations that would improve the shopping experience for these customers. Current technologies that assist customers during a retail shopping experience do not take into consideration as to where a customer is precisely located. There is therefore an opportunity to offer an improved and enhanced shopping experience for customers within a premise. In particular, there is an opportunity to enable effective and efficient object location, object identification, comparison shopping, and other beneficial functionalities. More particularly, there is an opportunity to provide customers information relevant to objects available for sale within a premise using hyper-local location techniques.

BRIEF SUMMARY

In one embodiment, a computer-implemented method in an electronic device of enhancing a shopping experience within a premise using hyper-local location techniques is provided. The method may include initiating, by a processor, an application on the electronic device. The application may be associated with a customer and with a retailer that has at least one physical premise. The method may further include determining, by the processor, a location of the electronic device based on one or more sensors of the electronic device (e.g., based on information detected by the one or more sensors). The method may further include generating, by the processor, object capture information (e.g., image data, video data, or augmented reality data) based on detecting at least one object at the physical premise by a viewfinder of the electronic device. Additionally, the method may further include displaying, on an interface associated with the electronic device and with the application, notification information particular to the at least one object corresponding to the location of the electronic device and the object capture information.

In another embodiment, an electronic device may be provided. The electronic device may include one or more transceivers configured to connect (e.g., to communicatively connect) with one or more servers associated with a retailer. The retailer may have at least one physical premise. The electronic device may also include a user interface configured to display content, one or more sensors configured to determine, detect, or sense information indicative of the location of electronic device, a viewfinder configured to determine, detect, capture, or sense at least one object at the physical premise, and a memory storing an application that is electronically associated with the retailer and with a customer. Additionally, the electronic device may include a processor interfacing with the one or more transceivers, the user interface, the one or more sensors, the viewfinder, and the memory. The processor may be configured to initiate the application associated with the retailer and the customer, and determine, based on information determined by the one or more sensors, the location of the electronic device. The processor may be further configured to generate, based on detecting the at least one object at the physical premise by the viewfinder, object capture information, and further cause the user interface to display, via the application, notification information particular to the at least one object corresponding to the location of the electronic device and the object capture information.

In another embodiment, a system may be provided. The system may include one or more data storage devices storing object identification information (e.g., machine learning data) corresponding to at least one object associated with a retailer having at least one physical premise. The system may also include a communicative interface to an application executing on an electronic device. The application may be associated with the retailer and a customer. Additionally, the system may include one or more processors that interface with the one or more data storage devices and the communicative interface. The one or processors may be configured to receive, from the application, location information of the electronic device based on one or more sensors of the electronic device; determine the location of the electronic device based on a location identifier embedded in the location information; receive, from the application, object capture information based on detecting the at least one object at the physical premise by a viewfinder of the electronic device; and facilitate a search query using the object identification information retrieved from the data storage device, the location of the electronic device, and the object capture information to generate notification information particular to the at least one object at the physical premise. The one or more processors may be further configured to transmit the notification information to the application for display on a user interface of the electronic device.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1A:
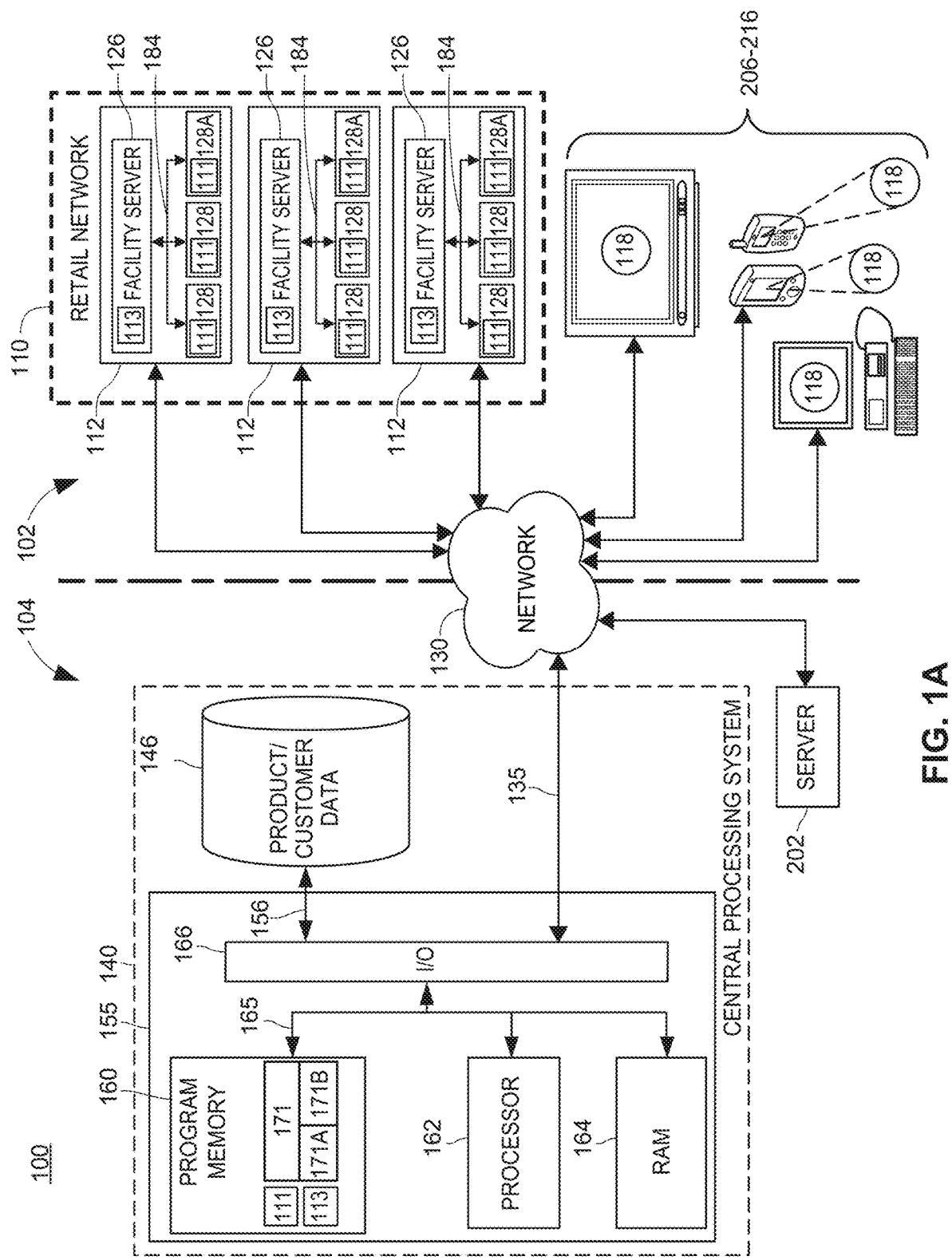
FIGS. 1A-1D illustrate various front end and back end devices and components of an example system for providing information relevant to objects available for sale within a premise using hyper-local location techniques, and connections therebetween, in accordance with some embodiments.

The systems and methods disclosed here relate generally to improving a retail shopping experience for customers. According to certain aspects, the systems and methods may leverage communications and other hardware and software capabilities of electronic devices to facilitate search queries and hyper-local location techniques in the retail shopping experience context, and automatically and dynamically provide relevant information resulting from the search queries and hyper-local location techniques to the customers. Hyper-local location techniques aim to determine the precise geo-location of a customer (e.g. to within a few feet). The precision in determining geolocation distinguishes such techniques over conventional location-tracking techniques that provide approximate location (e.g., city or zip code), such as techniques largely based on utilizing IP addresses. By leveraging hyper-local location techniques with search queries (e.g., to look up objects that may be purchased inside a premise), customers may be informed of various information about the precise object that the customer is standing in front of for example, and thus may be provided with an improved retail shopping experience.

According to embodiments, an electronic device may communicate with a server associated with a premise, such as a server within the premise or a backend server. The premise may be part of a chain of premises associated with a single company or entity. The electronic device in combination with the server may identify a premise proximate to the electronic device, or otherwise a premise in which the electronic device is located. The electronic device may enable a customer to electronically capture an object (e.g., image, video, augmented reality feed) by using the viewfinder of a camera within the electronic device. In addition, the electronic device may determine the precise location of the customer based on one or more sensors of the electronic device (e.g., Bluetooth sensor, GPS sensor, WiFi sensor). The object capture information and the location of the electronic device that is in essence, associated with objects or services available for sale within the premise, may be communicated to the server. The server may be configured to execute a query based on the object capture information and the location of the electronic device to identify the object that has been electronically captured by the customer, and to provide the customer with information relevant to the electronically captured object. By using a computer vision model that utilizes location of the electronic device, the server may improve its accuracy in correctly identify the object, thereby capable of providing the customer with relevant information pertaining to the correctly-identified object.

Specifically, the server may send results from the query to the electronic device, where the results may include the identity of the objects or services, the price, any relevant coupons or discounts, any relevant reviews or ratings, or a suitable contextual information (e.g., drug interactions in the context of vitamin objects). The electronic device may dynamically and automatically present or display the results in a user interface for the customer to view and request additional information. The electronic device may support a dedicated application that is associated with the premise or retail chain, where the application may be capable of facilitating the features and enabling the customer to make various selections and control operation of the features.

The embodiments as discussed herein therefore offer benefits to users of the electronic devices as well as to retailers. In particular, the dynamic search results may provide relevant information to supplement a customer's shopping experience within the premise, thus improving the in-store experience for the customer. Further, by offering the search-related features to customers, retailers are able to build brand loyalty, increase customer retention, and generally increase in-store customer traffic and sales resulting therefrom. By identifying objects or services specifically located where the customer is, the retailer may also improve its inventory tracking capabilities, as the availability of objects or services for a specific store can be identified in part, by the customer electronically capturing the object or service at the specific store, as well as by the electronic device providing its location. It should be appreciated that other advantages and benefits are envisioned.

The systems and methods discussed herein therefore address several challenges that are particular to electronic devices and computer vision models. In particular, one challenge relates to the general inability of electronic devices to be aware of their current environments or settings. The electronic devices of the present embodiments have the capability to dynamically indicate information associated with the objects, such as locations within the store, and may connect to external components (e.g., a server) to dynamically execute queries associated with objects available for sale within a proximity of the electronic devices. Another challenge relates to the general inability of computer vision models to identify objects that are electronically captured by consumers, accurately, and subsequently, to mine for information pertaining to the identified objects that are relevant to the consumer in a retail shopping experience context. The computer vision models of the present embodiments have the capability to receive as an input the location of the objects to assist in a more accurate identification and query process. Accordingly, the systems and methods are necessarily rooted in computer technology in order to overcome the noted shortcomings that specifically arise in the realm of electronic devices and computer vision models.

Similarly, the systems and methods provide improvements in a technical field, namely, e-commerce. Instead of the systems and methods merely being performed by hardware components using basic functions, the systems and methods employ complex steps that go beyond the mere concept of simply retrieving and combining data using a computer. In particular, the hardware components enable the unconventional inputs to a search query, interface with a server to execute the search query, receive search results more accurate than conventional search results, dynamically display the search results, and facilitate the e-commerce functionalities via the network connections. This combination of elements impose meaningful limits in that the operations are applied to improve e-commerce by enabling electronic device customers to facilitate enhanced or improved e-commerce features that utilize current network capabilities in a meaningful and effective way.

Turning now to FIG. 1A, FIG. 1A illustrates an overall system 100 including various components configured to implement the various embodiments. The system 100 may include a combination of hardware and software components, as well as various data communication channels for communicating information or data between and among the various hardware and software components. The system 100 may be roughly divided into front-end components 102 and back-end components 104. At least one of the front-end components 102 may be primarily disposed within a retail network 110 that may include one or more physical premises 112. The physical premises 112 may be located, by way of example rather than limitation, in separate geographic locations from each other, including different areas of the same city, different cities, or even different states. According to the present embodiments, each of the physical premises 112 may be a "brick and mortar" store that may include one or more physical buildings or structures, where each of the physical premises 112 may accommodate shoppers and customers. A brick and mortal store may be distinguished from an on-line store or website, or a mail-order store.

The front-end components 102 may include a number of workstations 128 or computing devices. The workstations 128 may be local computers located in the various physical premises 112 throughout the retail network 110 and may be capable of executing various applications. Premise personnel (not shown) may use the applications executing at the workstations 128 to, for example, access customer information, access images, and payment information, and/or other data.

Short-range communication-enabled devices (or client devices) 206-216 (e.g., personal computers, cellular phones, smart phones, internet-enabled televisions, etc.) may be communicatively connected to the physical premises 112 that are equipped with beacons, and/or to the back end components 104, such as system 140, through one or more digital networks 130, as described below. The client devices 206-216 may, but need not be, disposed within the retail network 110.

Those of ordinary skill in the art will recognize that the front-end components 102 may also comprise a plurality of facility servers 126 disposed at the plurality of physical premises 112 instead of, or in addition to, a plurality of workstations 128. Each of the physical premises 112 may include one or more facility servers 126 that may facilitate communications between the workstations 128 of the physical premises 112 via the digital network(s) 130, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 may also refer to the facility servers 126, and vice versa. Moreover, environments other than the physical premises 112 may employ the workstations 128 and the servers 126.

The front-end components 102 may communicate with the back-end components 104 via the digital network(s) 130. One or more of the front-end components 102 may be excluded from communicating with the back-end components 104 by configuration or by limiting access due to security concerns. For example, the short-range communication-enabled devices 206-216 may be excluded from direct access or only provided with limited access to the back-end components 104. In some embodiments, the physical premises 112 may communicate with the back-end components via the digital network(s) 130. In other embodiments, the physical premises 112 and the short-range communication-enabled devices 206-216 may communicate with the back-end components 104 via the same portions of the digital network 130, but digital access rights, IP masking, and other network configurations may deny access to the short-range communication-enabled devices 206-216. In an embodiment, the network 130 may include respective, local wireless communication networks provided in or near the physical premises 112 via which short-range communication-enabled devices 206-216 may communicatively connect to other front-end components 102 and/or to the back-end components 104. The network 130 may additionally or alternatively support communicative connections between applications 118 executing on the devices 206-216 and the back-end components 104. For example, the applications 118 may include a web-browser and/or a downloaded retailer client application that communicate with one or more back-end components 104 via the network 130.

The digital network(s) 130 may be a proprietary network, a secure public Internet, a virtual private network or some other type of network, such as dedicated access lines, plain ordinary telephone lines, satellite links, wireless links, wired links, combinations of these, etc. Where the digital network 130 comprises the Internet, data communication may take place over the digital network 130 via an Internet communication protocol. In addition to one or more servers 202 that are configured to communicate with client or front-end applications (e.g., as described below), the back-end components 104 may include the central processing system 140.

Of course, the physical premises 112 may be communicatively connected to different back-end components 104 having one or more functions or capabilities that are similar to the central processing system 140. The central processing system 140 may include one or more computer processors 162 adapted and configured to execute various software applications, computer vision model(s), and components of the system 100, in addition to other software applications. The central processing system 140 may further include one or more databases 146. The database(s) 146 may comprise one or more data storage devices that are adapted to store data related to the operation of the system 100, such as object data, customer data, and/or object identification information such as machine learning data (e.g., training data, inference data). Additionally, the database(s) 146 may store information associated with items/objects and/or services that are available for sale in various ones of the physical premises 112. For example, the database(s) 146 may store identities of the items/objects (e.g., brands of the objects, such as Pantene Pro-V shampoo), locations of the items/objects (e.g., aisle number or other information), pricing information, availability and inventory information, coupon(s) or discount(s) associated with the items/objects and/or services, contextual information (e.g., drug interactions in the context of vitamin objects), and more detailed information associated with the items/objects and/or services (e.g., object descriptions). Additionally or alternatively, the database(s) 146 may store information related to various customers or users associated with the retailer, e.g., user accounts. The central processing system 140 may access data stored in the database(s) 146 when executing various functions and tasks associated with the operation of the system 100. The central processing system 140 may also maintain and update the data stored in the database(s) 146. For example, the central processing system 140 may generate coupons for the items/objects and/or services, update availability and inventory information (such as if a certain object is purchased from one of the physical premises 112), and/or update passwords, user preferences, and default payment methods for various users. It should be appreciated that additional data and additional techniques for maintaining and updating the data are appreciated. It should also be appreciated that although the database 146 is shown as a single entity in FIG. 1A, the database 146 may be implemented using any one or more databases and any one or more data storage devices.

Further, although FIG. 1A depicts the system 100 as including the central processing system 140 in communication with three physical premises 112, and various short-range communication-enabled devices 206-216 it should be understood that different numbers of processing systems, premises, and devices may be utilized. For example, the digital network(s) 130 (or other digital networks, not shown) may interconnect the central processing system 140 to a plurality of included central processing systems 140, hundreds of physical premises 112, and thousands of short-range communication-enabled devices 206-216. According to the disclosed example, this configuration may provide several advantages, such as, for example, enabling near real-time uploads and downloads of information as well as periodic uploads and downloads of information. This may provide for a primary backup of all the information generated in supported functionalities. Alternatively, some of the physical premises 112 may store data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 may include a program memory 160, the processor 162 (which may be called a microcontroller or a microprocessor), a random-access memory (RAM) 164, and the input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain or be configured with machine-readable instructions (i.e., software) 171, for execution by the processor 162. The software 171 may perform the various tasks associated with operation of the premises, and may be a single module 171 or a plurality of modules 171A, 171B. While the software 171 is depicted in FIG. 1A as including two modules, 171A and 171B, the software 171 may include any number of modules accomplishing tasks related to premise operation. The central processing system 140 may implement a server application 113 for providing data to a user interface application 111 operating on the workstations 128 and/or applications 118 operating on short-range communication-enabled devices 206-216.

Figure 1B:
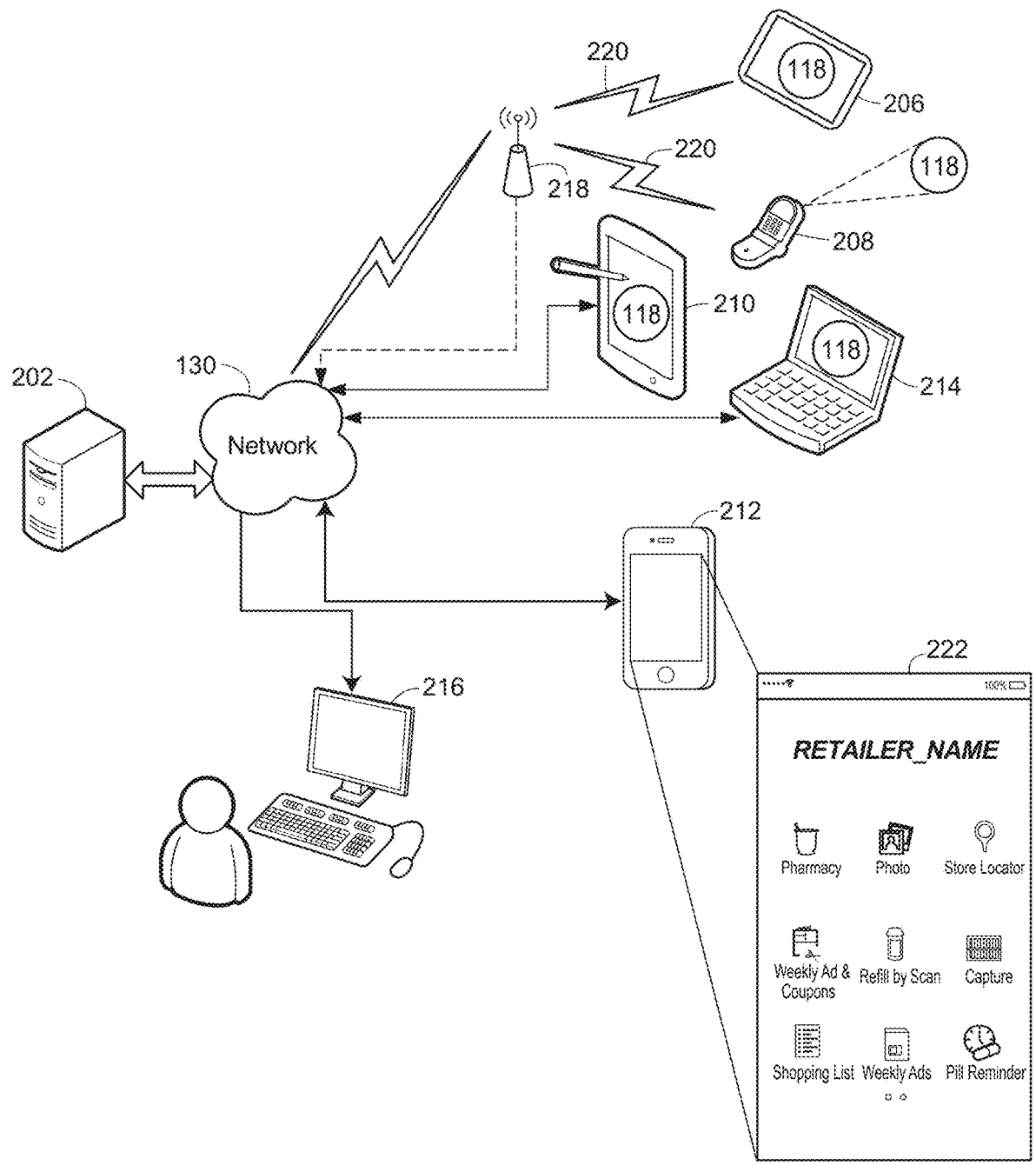

For purposes of implementing the system 100, a customer may interact with the server 202 and the premise systems (e.g., the central processing system 140) via one of the short-range communication-enabled devices 206-216 via a mobile device application, a specialized application, or one or more web pages 118. In an example, FIG. 1B depicts the server 202 connected via the network 130 to the short-range communication-enabled devices 206-216 executing or running applications 118 through which a customer may initiate and interact with the system 100 (as shown in FIG. 1A). The short-range communication-enabled devices (or generally, "electronic devices") 206-216 may include, by way of example, a tablet computer 206, an Internet-enabled cell phone 208, a personal digital assistant (PDA) 210, a smart phone 212, a laptop computer 214, a desktop computer 216, a portable media player (not shown), and/or others. Further, each application 118 executing on its respective host device 206-216 may be a web browser, a client application provided by the retailer, or some other client application via which a communicative connection or session may be established with the server 202, e.g., to access the information associated with items/objects and/or services that are available for sale in various ones of the physical premises 112 and stored in database(s) 146.

The short-range communication-enabled devices 206-216 need not necessarily communicate with the network 130 via a wired connection. In some instances, the short-range communication-enabled devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the short-range communication-enabled devices 206-216 may interact with the server 202 to receive web pages or server data from the server 202 and may display the web pages or server data via its respective client application 118 (described below). For example, the mobile device 212 may display a home screen 222 (i.e., the root or start page at which customers enter the client application) of the retailer client application 118 to the customer, may receive an input (e.g., an image capture of an object) from the customer, and may interact with the server 202 depending on the type of user-specified input. It will be appreciated that although only one server 202 is depicted in FIG. 1B, multiple servers 202 may be provided for the purpose of distributing server load, serving different web pages, servicing different retailer client applications, etc. These multiple servers 202 may include a web server, an entity-specific server (e.g. an Apple® server, etc.), a server that is disposed in a retail or proprietary network, an independent third-party server that is not under the control of the entity, or others.

Figure 1C:
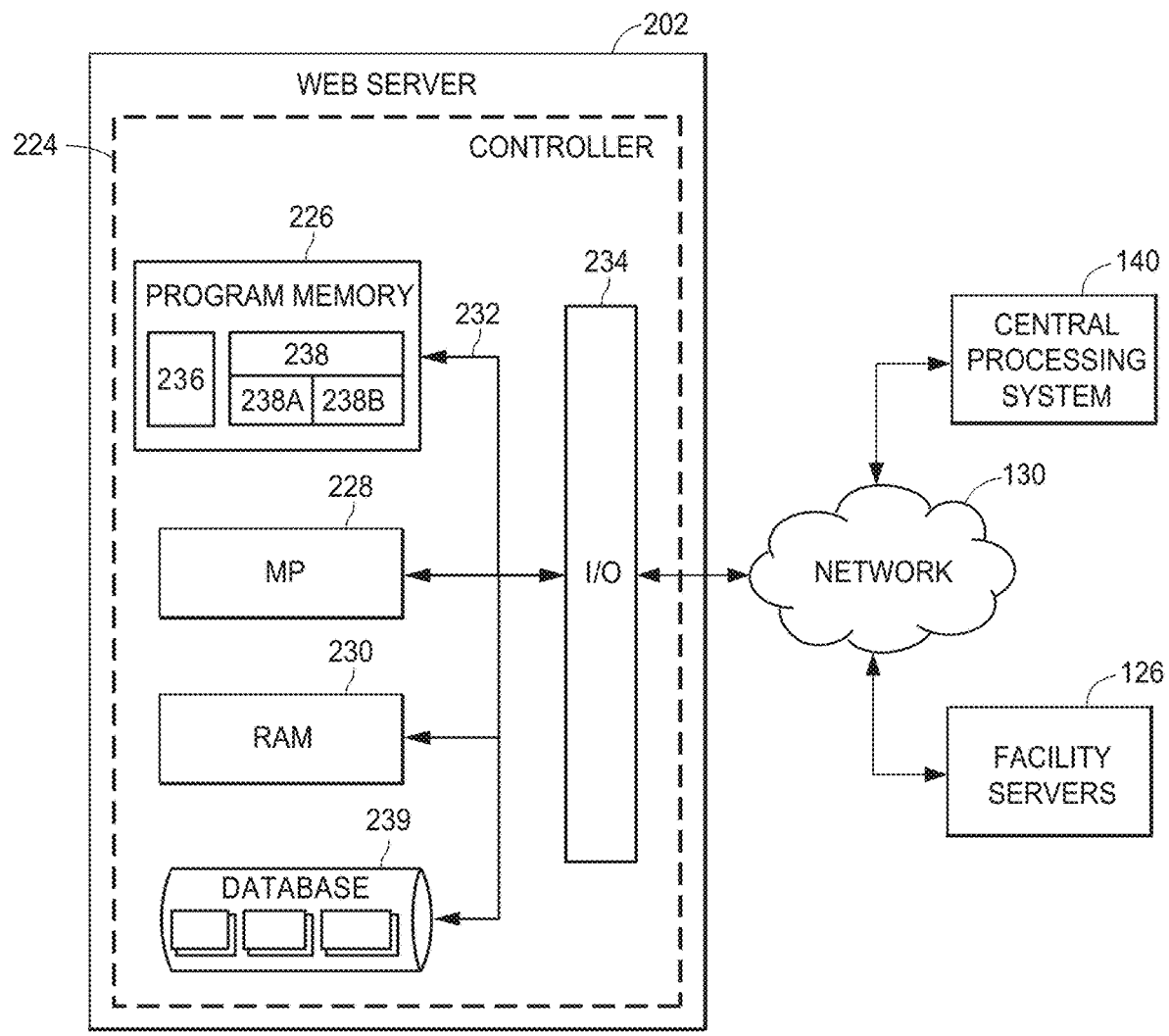

Turning now to FIG. 1C, the server 202, like the facility server 126, may include a controller 224. Similar to the controllers 155 and 170, the controller 224 may include a program memory 226, a microcontroller or a microprocessor (MP) 228, a random-access memory (RAM) 230, and an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, object data, machine learning data, mobile device application data, web page templates and/or web pages, and other data that may be used to interact with the customer through the network 130. According to embodiments, the database 239 may store the same or similar data as that stored by the database 146 as discussed with respect to FIG.

1A. Further, the database 239 may be implemented on one or more data storage devices.

As discussed with reference to the controllers 155 and 170, it should be appreciated that although FIG. 1C depicts only one microprocessor 228, the controller 224 may include multiple microprocessors 228. Similarly, the memory of the controller 224 may include multiple RAMs 230 and multiple program memories 226. Although the FIG. 1C depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the short-range communication-enabled devices 206-216, as depicted in FIG. 1B, FIG. 1C illustrates that the server 202 may also be connected through the network 130 to the central processing system 140 and/or one or more facility servers 126. As described below, the connection of the server 202 to the central processing system 140 may assist in facilitating various functionalities. As a result, the server 202 may act as a routing or interfacing server between the plurality of short-range communication-enabled devices 206-216 and a destination server, namely, the central processing system 140. For example, the server 202 may be configured to communicate with the central processing system 140 and with the short-range communication-enabled devices 206-216 via a multitude of protocols, such as packet-switched protocols, web services, web APIs (Application Programming Interface), etc. The server 202 may also convert (if necessary) and route client application data (not shown) to the appropriate server, such as the central process system 140 for example. Additionally, the server 202 may act as the destination server and need not route any data from the short-range communication-enabled device 206-216.

As shown in FIG. 1C, the program memory 226 and/or the RAM 230 may store various applications for execution by the microprocessor 228. For example, a user-interface application 236 may provide a user interface to the server 202, which user interface may, for example, enable a network administrator to configure, troubleshoot, or test various aspects of the server's operation, or otherwise to access information thereon. A server application 238 may operate to populate and transmit client application data and web pages to the short-range communication-enabled devices 206-216, receive information from the customer transmitted back to the server 202, and forward appropriate data to the central processing system 140 and the facility servers 126.

Like the software 171 of FIGS. 1A and 1B, the server application 238 may be a single module 238 or a plurality of modules 238A, 238B. While the server application 238 is depicted in FIG. 1C as including two modules, 238A and 238B, the server application 238 may include any number of modules that may facilitate tasks related to implementation of the server 202. By way of example, the module 238A may populate and transmit the client application data and/or may receive and evaluate inputs (e.g., image, video, or augmented reality capture of an object) from the customer to receive a data access request, while the module 238B may communicate with one or more of the back end components 104 to fulfill a data access request.

In order to evaluate and identify a retail object based on inputs (e.g., image, video, or augmented reality capture of an object) from the customer, the server application 238 may apply various machine learning techniques, utilize a computer vision model and/or communicate with the database 239, which includes object data and machine learning data, among other data. Accordingly, the server application 238 may determine likelihoods that the retail object captured by the customer corresponds to machine learning data (e.g., training data of prior identified retail objects, which includes information pertaining to where the prior identified retail objects are located in a store) based on visual descriptors, location descriptors, and semantic cues for the retail object (e.g., object data). In one embodiment, the server application 238 may employ a nearest neighbors algorithm including naïve Bayes nearest neighbor classifiers. For example, for an object or for several objects in an image captured by the customer, the server application 238 may extract the visual and location descriptors (e.g., corresponding to the location determined by the electronic device) which may be compared to nearest neighbor visual and location descriptors from the training data and inference data (e.g., the visual and location descriptors in the training data and inference data that is the most similar to the visual an location descriptors from the retail object captured by the customer). Some visual and location descriptors from the training data and inference data may be visual and location descriptors in a vast majority of the retail objects. Such descriptors may not be as helpful in determining the retail object corresponding to the object as descriptors which are not present in many of the retail objects. Accordingly, the likelihood that the object corresponds to a retail object pre-identified in training data and inference data based on visual and location descriptors may decrease in proportion to the frequency that the visual and location descriptors occur in each of the retail objects in the training data and inference data. The server application 238 may identify a nearest neighbor retail object, for example, by selecting the nearest neighbor visual and location descriptors that are the most similar to the visual and location descriptors for the customer's object and which occurs the least frequently in all of the retail objects in the training data and inference data. In the same or other embodiments, a semantic cue for the object such as text may be compared to text in the training data and inference data to identify the amount of matching text characters, words, or symbols. The likelihood that the customer's object corresponds to the pre-identified retail object in the training data and inference data based on the text may be determined according to the amount of matching text characters, words, or symbols. Additional machine learning algorithms for determining likelihoods that the object corresponds to retail objects in the training data and inference data may include naïve Bayes, clustering, random forests, boosting, decision trees, support vector machines, artificial neural networks, Gaussian process regression, etc.

Figure 1D:
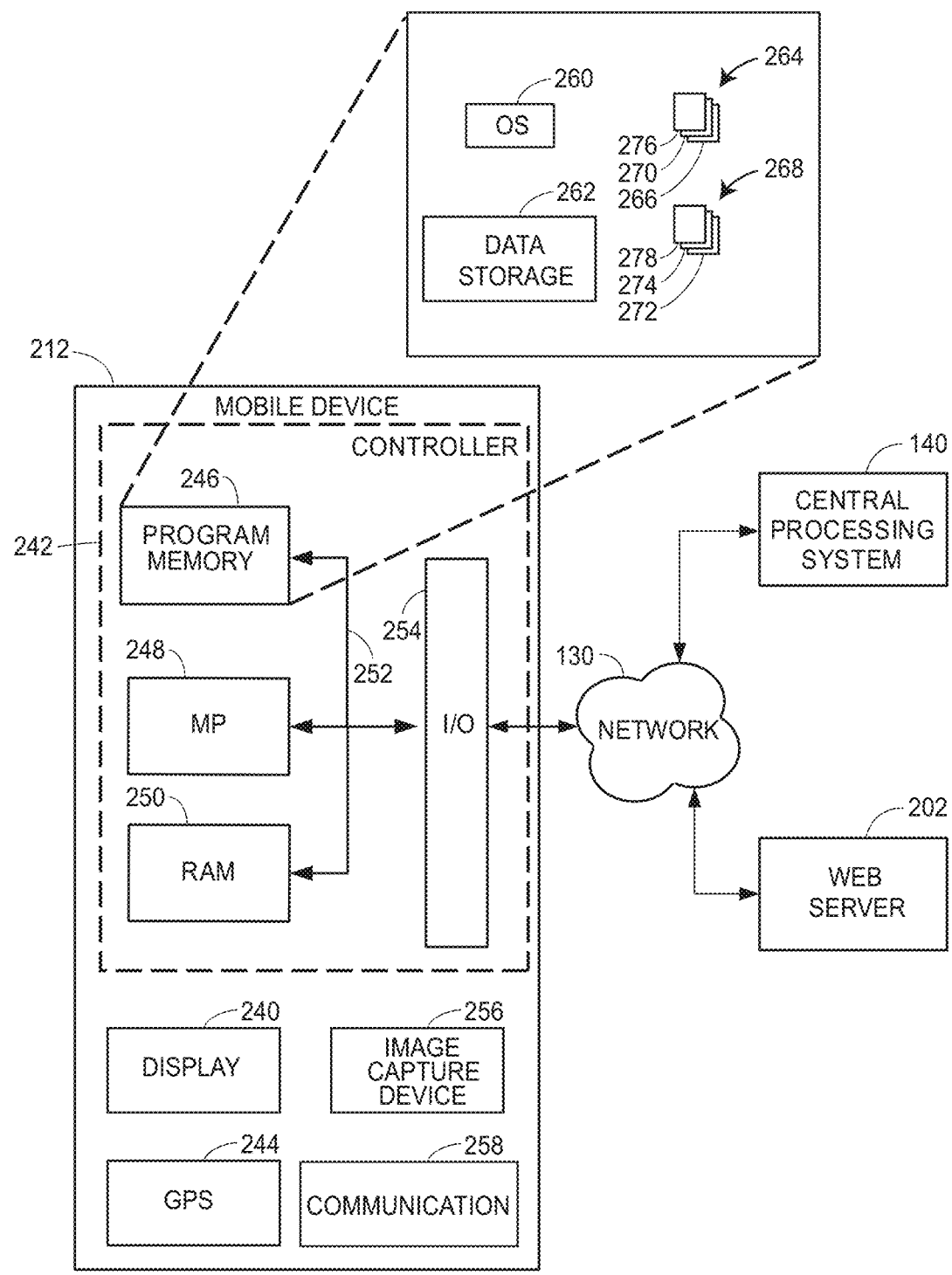

Referring now to FIG. 1D, the mobile device 212 (or any of the short-range communication-enabled devices 206-216) may include a display 240, one or more location sensors 244 (e.g., a Global Positioning System (GPS) unit, Bluetooth sensor), a communication unit 258 (which may include respective one or more sensors), a viewfinder of a camera 256, a user-input device (not shown), and, like the server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which may be interconnected via an address/data bus 252.

The program memory 246 may include an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple® Inc., Google® Inc., Palm® Inc. (now Hewlett-Packard Company®), Microsoft Corporation®, Research in Motion® (RIM), and Nokia®, respectively. The data storage 262 may include data such as customer profiles, application data for the plurality of applications 264, routine data for the plurality of routines 268, and other data necessary to interact with the server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that may reside within the mobile device 212.

The one or more location sensors 244 may include a GPS unit, which may use "Assisted GPS" (A-GPS), satellite GPS, or any other suitable global positioning protocol, transceivers, sensors, or system that locates the position of the mobile device 212. For example, A-GPS utilizes terrestrial cell phone towers or Wi-Fi hotspots (e.g., wireless router points) to more accurately and more quickly determine location of the mobile device 212 while satellite GPS generally may be more useful in more remote regions that may lack cell towers or Wi-Fi hotspots. The one or more location sensors 244 may also include a short-range communication sensor (e.g., Bluetooth sensor) capable of receiving a short-range communication signal (e.g., Bluetooth signal) from a beacon located at a premise. The communication unit or module 258 may communicate with the server 202 via one or more transceivers that support any suitable wireless communication protocol network or networks, such as a wireless telephony network (e.g., GSM, CDMA, LTE, etc.), a WLAN network (or other similar network according to 802.11 standards), a WiMAX network, a Bluetooth network, and/or others. In some implementations, the wireless communication protocols and/or networks supported by the communication unit or module 258 may transport location information or information indicative of a location of the electronic device 212. For example, upon receiving a short-range communication signal from a beacon, the communication unit or module 258 may transport short-range communication data indicative of a location of the electronic device 212, as it is proximate to the beacon, to the server 202.

The viewfinder 256 may be a built-in camera within the mobile device 212 or may be an external camera, such as a webcam, that is communicatively coupled with the mobile device 212 (or any other short-range communication-enabled device 206-216). In some embodiments, the viewfinder 256 may support scanning or capturing a code, identification, or the like (e.g., a UPC scanner, a QR code reader, etc.) associated with a particular object. The user-input device or generally a user interface (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. The user interface (which may include the display 240) may be configured to present information to the customer and/or receive inputs from the customer, and may accordingly include a set of I/O components (e.g., capacitive or resistive touch sensitive input panels, keys, buttons, lights, LEDs, cursor control devices, haptic devices, and others). In embodiments, the display 240 may be a touchscreen display using singular or combinations of display technologies and can include a thin, transparent touch sensor component superimposed upon a display section that is viewable by a customer. For example, such displays include capacitive displays, resistive displays, surface acoustic wave (SAW) displays, optical imaging displays, and the like.

As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native web browser 270, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from the server 202, the facility servers 126, or the server applications 113 while also receiving inputs from the user.

Another application of the plurality of applications may include a location awareness application 276 that may be implemented as a series of machine-readable instructions for receiving, interpreting, and displaying location information of the mobile device 212 (or any other short-range communication-enabled device 206-216), e.g., as determined based on information detected or determined by the one or more location sensors 244 (e.g., Bluetooth sensor). One of the plurality of routines may include an object capture routine 272 that coordinates with the viewfinder 256 to retrieve image data, video data, or augmented reality data for use with one or more of the plurality of applications, such as the client application 266, or for use with other routines. Another routine in the plurality of routines may include an object display routine 274 that receives and interprets image data, video data, or augmented reality data of any type or format for display. Likewise, the object display routine 274 may coordinate with the object capture routine 272 to obtain image data, video data, or augmented reality data and process such data into a displayable format for use with the client application 266.

A customer or generally a user may launch the client application 266 from a short-range communication-enabled device, such as one of the short-range communication-enabled devices 206-216, to access the server 202 cooperating with the central processing system 140 and the retail network 110. Additionally, the customer or the user may also launch or instantiate any other suitable user interface application 118 (e.g., the web browser 270, or any other one of the plurality of software applications 264) to access the server 202, the facility servers 126, or the server applications 113. Generally, the term "user" is used when referring to a person who is operating one of the short-range communication-enabled devices 206-216 and is not exclusive of the term "customer." For example, multiple users may utilize a particular customer's account, such as when children utilize their parent's account. As described above, one or both of the databases 146 and 182, illustrated in FIGS. 1A and 1B, respectively, may include various information about the premise's customers, as well as basic biographical information about the customer, such as a customer name, a customer address, a customer phone number, coupons redeemed by the customer, and the like. Customer account records are among the exemplary data that the system 100 may store on the databases 146 and 182.

In general, a computer program object in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 248 (e.g., working in connection with the operating system 260) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 2:
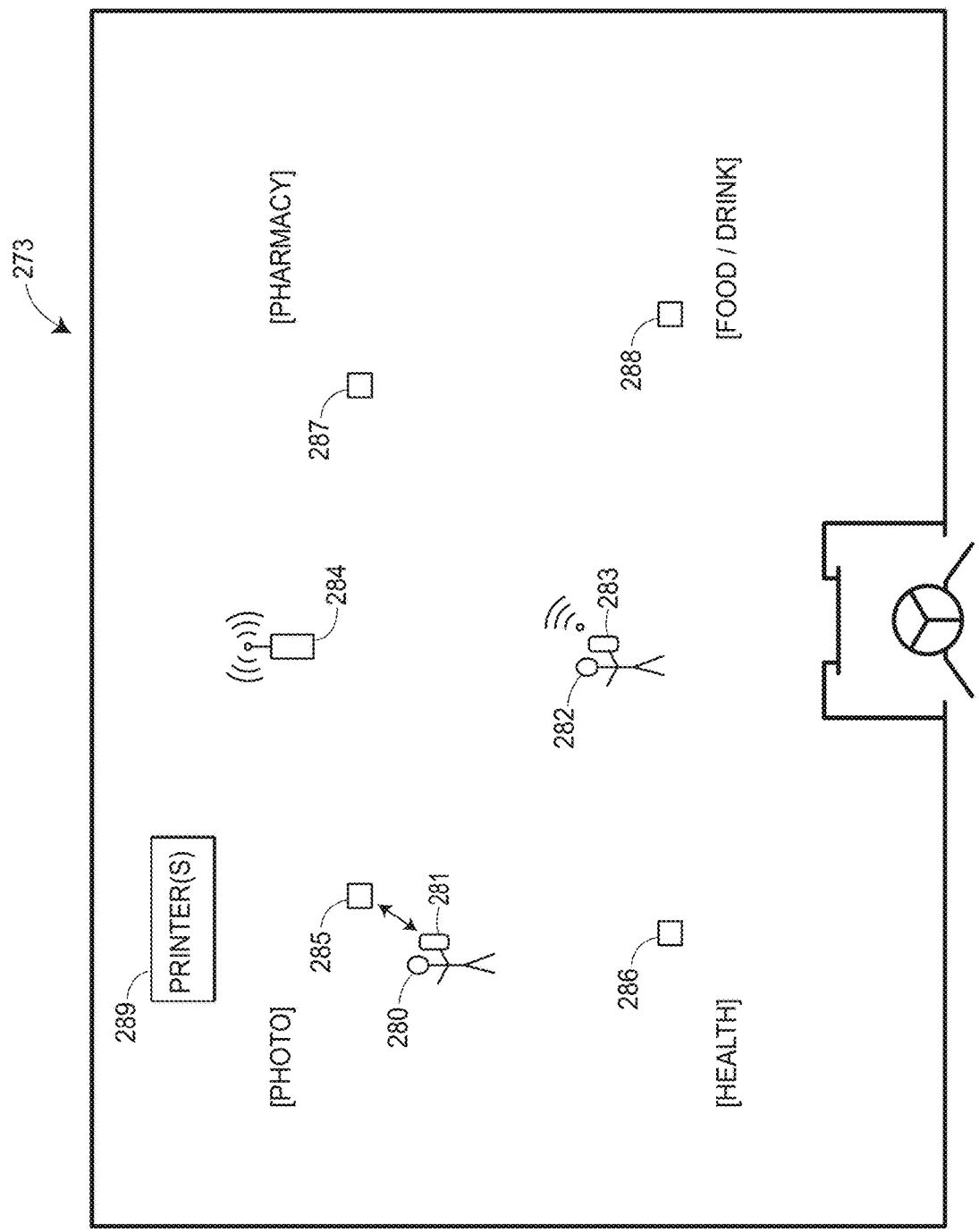
FIG. 2 depicts an exemplary layout of a physical premise of a retailer and supported connections, in accordance with some embodiments.

Referring to FIG. 2, depicted is an example layout of an example physical premise 273 (such as the physical premise 112 as described with respect to FIG. 1A). In the example depicted in FIG. 2, the physical premise 273 may include different departments or sections (as shown: photo, pharmacy, bath and beauty, and food/drink); however it should be appreciated that other types of premises and general environments are envisioned. Each of the different departments or sections may include various components, devices, or the like. For example, as depicted in store 273, the photo section may include one or more printers 289 that may be configured to print digital images.

Customers or users 280, 282 may enter the premise, browse in the various departments or sections, and/or purchase any desired items/objects or services. Each of the customers 280, 282 may be equipped with a respective electronic device 281, 283 (such as one of the short-range communication-enabled devices 206-216 as described with respect to FIG. 1A). Each electronic device 281, 283 may be any type of portable electronic device, for example, a notebook computer, a tablet, a mobile phone, a Personal Digital Assistant (PDA), a smart phone, a tablet computer, a multimedia player, an MP3 or MP4 player, a digital or analog broadcast receiver, a remote controller, or any other electronic apparatus.

According to embodiments, the physical premise 273 may support various wireless local area network s (WLAN) and wireless personal area networks (WPAN) to which the electronic devices 281, 283 may connect. In one particular implementation, the physical premise 273 may include one or more wireless access points (AP) 284 to which the electronic devices 281, 283 may connect, e.g. via a suitable transceiver and a WLAN connection. Accordingly, when the electronic devices 281, 283 are connected to the AP 284, the electronic devices 281, 283 may be connected to the local area network implemented within the physical premise 273 (i.e., the physical premise 273 may be an Internet "hotspot").

The physical premise 273 may also be configured with a plurality of transmitters, transceivers, or beacons 285, 286, 287, 288 that may be disposed throughout the area of the physical premise 273. Although FIG. 2 depicts the physical premise 273 supporting four (4) transmitters, transceivers, or beacons 285-288, it should be appreciated that the physical premise 273 may support fewer or additional transmitters, transceivers, or beacons. The plurality of transmitters, transceivers, or beacons 285-288 may be disposed in various locations of the physical premise 273 (e.g., each department may include a single transmitter). Each of the plurality of transmitters, transceivers, or beacons 285-288 may be secured to various components of the physical premise 273 (e.g., shelves, ceiling, etc.). Each of the plurality of transmitters, transceivers, or beacons 285-288 may include any combination of hardware and software components, including a module for transmitting or broadcasting signals. Further, each of the plurality of transmitters, transceivers, or beacons 285-288 may be configured to be powered by a battery or via another power source.

According to embodiments, each of the plurality of transmitters, transceivers, or beacons 285-288 may support one or more short-range communication protocols such as radio-frequency identification (RFID), Bluetooth®, Bluetooth® low energy (BLE), Infrared Data Association (IrDA), near field communication (NFC), ZigBee, other protocols defined under the IEEE 802 standard, and/or other technologies. Each of the plurality of transmitters, transceivers, or beacons 285-288 may also be configured to broadcast or transmit a short-range communication signal that may include any stored data. In one embodiment, each of the plurality of transmitters, transceivers, or beacons 285-288 may continuously broadcast a short-range communication signal that may include a unique identifier of the corresponding transmitters, transceivers, or beacons 285-288. The unique identifier may serve as a location identifier for the transmitters, transceivers, or beacons 285-288, which may, by extension, indicate the location of one of the electronic devices 281, 283 as the electronic devices 281, 283 detect the short-range communication signal.

The signals that the transmitters, transceivers, or beacons 285-288 broadcast may have an associated detection range depending on the type of communication protocol. Generally, Bluetooth® signals have a range of 100 meters and BLE signals have a range of 50 meters. The detection range of the signal that the transmitters, transceivers, or beacons 285-288 broadcast may also vary and may be programmable. For example, the range of a first signal that is broadcast by the transmitter, transceiver, or beacon 285 may be fifteen (15) meters while the range of a second signal that is broadcast by the transmitter, transceiver, or beacon 286 may be twenty-five (25) meters.

When one of the electronic devices 281, 283 is within broadcast range of one of the transmitters, transceivers, or beacons 285-288, the electronic devices 281, 283 can detect and receive the signal, e.g. via a suitable transceiver, thereby determining its location. In particular, a communication module of the electronic devices 281, 283 that supports a short range communication protocol (e.g., a BLE chip) can detect and receive the signal. For example, FIG. 2 depicts the electronic device 281 detecting the signal broadcast by the transmitters, transceivers, or beacons 285.

According to embodiments, the electronic devices 281, 283 (and any application executing thereon) may facilitate various features of a customer's retail experience when connected to various ones of the connections within the physical premise 273. In particular, the electronic devices 281, 283 may detect one or more of the transmitters, transceivers, or beacons 285-288, and/or may connect to (or may detect the availability of) the access point 284, and may in turn connect to an on-site server or a remote server to facilitate a customer's retail experience within the physical premise 273.

Figure 3:
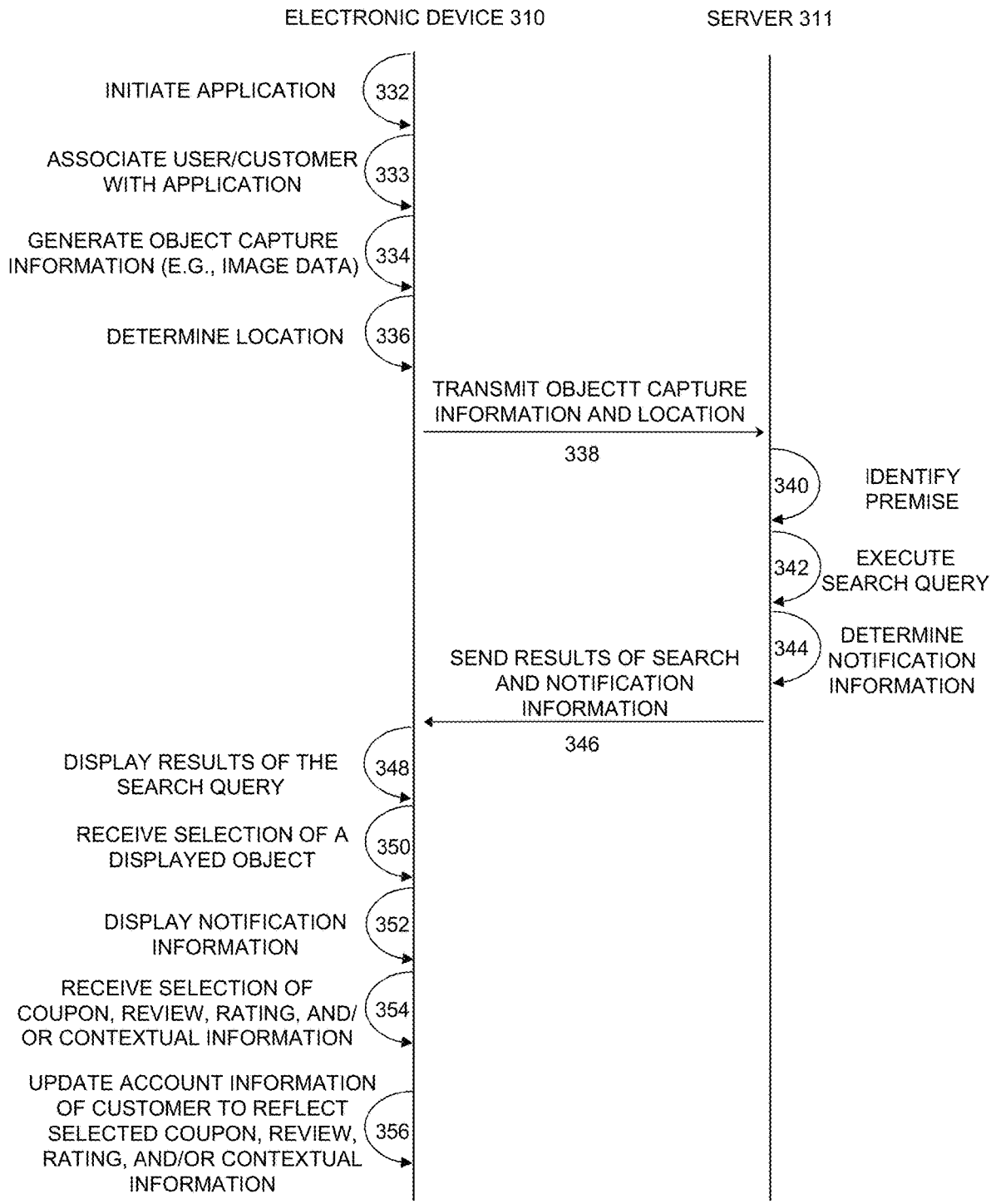
FIG. 3 is an example signal diagram associated with providing information relevant to objects available for sale within a premise using hyper-local location techniques, in accordance with some embodiments.

FIG. 3 depicts an example signal diagram 300 associated with facilitating search queries and hyper-local location techniques in the retail shopping experience context. In particular, the signal diagram 300 depicts supplementing and enhancing search queries for the objects. For ease of discussion, and not for limitation purposes, FIG. 3 is discussed with simultaneous reference to FIGS. 1A-1D and FIG. 2, although the signal diagram 300 of FIG. 3 may be utilized with other systems and other computing devices.

FIG. 3 includes an electronic device 310 and a server 311. According to embodiments, a user or customer may operate the electronic device 310 within a premise or similar environment. According to embodiments, a user may operate the electronic device 310 within a premise or similar environment. In an embodiment, the electronic device 310 may be one of the devices 206-216 of FIGS. 1A and 1B.

The server 311 may comprise one or more of the backend components 104 of the retailer, such as the server 202 and/or the central processing system 140 and/or may comprise one or more facility servers 126 of the retailer. Indeed, although the server 311 is discussed herein in the singular tense, it is understood that the server 311 may include any number of front-end and/or back-end servers of the retailer. Further, the server 311 may be located within the premise or similar environment, or may be a back-end component configured to directly communicate with the electronic device 310. In an implementation, if the server 311 is a back-end component, the electronic device 310 may connect to an in-store server (e.g., via a WLAN connection), which may communicate with the server 311. Although the embodiments describe facilitating searches for objects available for sale in a premise, it should be appreciated that the embodiments may also extend to available services.

The signal diagram 300 may begin when the electronic device 310 initiates (332) the execution of an application stored thereon, where the application may be associated with the retailer. In an embodiment, the application may be an instance of the application 118 of FIGS. 1A and 1B. For example, if the retailer is a pharmacy, then the application may be offered by the associated pharmacy company. In another example, the application may be a web browser that allows the user to access a website of the retailer. The application may enable the user to facilitate various operations and generally make selections through the electronic device 310, such as via a user interface of the electronic device 310. The electronic device 310 may connect to the server 311 prior to or in response to initiating the application. During operation of the application, the electronic device 310 may connect to, send data to, and receive data from the server 311, either directly or via an in-store server. According to embodiments, the electronic device 310 need not be located within the premise for the application to execute.

The user or customer may be electronically associated (333) with the instance of the initiated application executing on the device 310, for example, by generating, storing, and/or accessing electronically stored data linking the user or customer to the instance of the initiated application. Access to the initiated application may require authentication and/or authorization, e.g., by logging on with a user name/password combination, by providing an account number and/or personal identification number or PIN, or by otherwise identifying an authorized user of the initiated application. In an example, authentication and/or authorization of the user may be performed by the initiated application, by another application executing on the electronic device 310, and/or by the server 311.

The initiated application may enable the user to facilitate various operations and generally make selections at the retailer's store by using the electronic device 310, such as via a user interface of the electronic device 310. In particular, one of the features is a viewfinder capture feature that enables users to capture objects or items that may be for sale within the premise using a viewfinder (e.g., viewfinder 256) in preferred embodiments. Accordingly, the electronic device 310 may receive, retrieve, generate, or interpret (334) object capture information (e.g., image data, video data, or augmented reality data) from an object capture by the customer of the electronic device. In some embodiments, the electronic device 310 may support voice recognition technology whereby the customer may dictate a description or phrase associated with an object that the electronic device 310 may process to capture objects. In such embodiments, the electronic device 310 may receive, retrieve, generate, or interpret (334) voice data from an object capture by the customer of the electronic device.

The electronic device 310 may also identify (336) its location. In an implementation, the electronic device 310 may identify its GPS coordinates. In another implementation, the electronic device 310 may detect one or more available WLAN connections each having an associated service set identification (SSID) that identifies the corresponding network and a corresponding location (e.g., a location of a premise). In embodiments, the electronic device 310 may automatically connect to the in-store network, such as if the electronic device 310 has stored the SSID of the in-store network. Further, multiple premises may maintain consistent SSIDs such that the electronic device 310 may automatically connect to the in-store network of any premise in which it is located, even if the electronic device 310 has previously not connected to that in-store network. In a preferred embodiment, the electronic device 310 may connect to an in-store transmitter (e.g., Bluetooth beacon) that has an associated location within the premise. In addition, the electronic device 310 may simultaneously be connected to the in-store transmitter, identify its GPS coordinates, and detect one or more available WLAN connections. In identifying its location, the electronic device 310 may identify a premise in which the electronic device 310 may be located, where the premise may have an identification code (e.g., a unique number). In an embodiment, the electronic device 310 may be configured to continuously monitor its location, and may automatically determine when it is located near or within the premise. It should be appreciated that additional techniques for determining a location of the electronic device 310 are appreciated.

The electronic device 310 may send (338) the object capture information and its location to the server 311. It should be appreciated that the electronic device may send the actual object capture information and its location to the server 311, or indicators (e.g., representations, encrypted, or compressed versions of the actual object capture information and its location) to the server 311. It should also be appreciated that the electronic device may send the object capture information and its location in separate communications, at separate times (e.g., sequentially), simultaneously in separate communications, simultaneously in common communications (e.g., embedding the location of the electronic device within a metadata field of the object capture information), and/or the like. In a preferred embodiment, the electronic device 310 may first receive, retrieve, or interpret the object capture information to send the object capture information to the server 311, prior to identifying its location to send the location to the server 311. Because the server 311 may incur greater processing time to process the object capture information (e.g., to identify the object in an image) than to process the location, overall processing time to identify the object in light of the location may advantageously be reduced.

Further, the location may be in the form of identifying data, such as an SSID of an in-store WLAN connection, an identification of an in-store transmitter, or an identification of the premise, or all of the aforementioned. The server 311 may identify (340), based on the location of the electronic device 310 or other data (e.g., an identification of a transmitter to which the electronic device 310 connects), a premise in which the electronic device 310 may be located or which is in proximity to (or nearest to) the electronic device 310. In an implementation, there may be multiple premises in proximity to the electronic device 310, and the server 311 may identify the premise closest to the electronic device 310.

The server 311 may also execute (342) a search query using the received object capture information and the location of the electronic device 310. In executing the search query, the server 311 may account for the location of the electronic device 310, such as by using the premise identified in (340) to identify objects for sale within the premise. By accounting for the location, the server 311 may more accurately identify the object. For example, if the server 311 receives an image of a Pantene Pro-V shampoo captured by the customer using a viewfinder on the electronic device 310, and the server 311's machine learning capabilities determine that the identity of the object captured by the image may be either a Pantene Pro-V shampoo or an Eddy's ice cream, accounting for the fact that the location indicates that the electronic device 310 is located at the bath and beauty aisle of a store, the server 311 may more accurately identify the object as Pantene Pro-V shampoo, not Eddy's ice cream. The server 311 may also access, identify, or determine information associated with the objects, such as pricing information, coupon or discounts, rating or review, and/or other contextual information.

In one implementation, the server 311 may serially or concurrently execute multiple search queries in multiple databases that may store different information, where the queries may complete at different or varied times. For example, one database may store object description information and another database may store object location information. The server 311 may further access, identify, or determine (344) notification information, such as any coupon(s), discount(s), rating(s), review(s), and/or any contextual information for the relevant objects identified from the search query. In some embodiments, the server 311 may identify existing coupon(s), discount(s), rating(s), review(s), and/or any contextual information for the objects, or may dynamically and automatically generate coupon(s), discount(s), and/or any contextual information for the objects. For example, the server 311 may determine that multiple users are searching for the same type of shampoo, and may dynamically generate a coupon for that shampoo. It should be appreciated that the server 311 may execute the search quer(ies) using various techniques, algorithms, or the like, and according to varying degrees of granularity. For example, the server 311 may search for universal coupons or store-specific coupons for an identified object.

The server 311 may send (346), to the electronic device 310, the results of the search query (i.e., the item(s) or object(s) available for sale), any information associated with the item(s) or object(s), and any coupon(s), discount(s), review(s), rating(s), or contextual information. It should be appreciated that the server 311 may send any combination of this notification information, as well as varying amounts of this notification information. For example, there may be more search results for a search query of an image of a shampoo compared to a search query of an image of garbage bags. Further, the server 311 may automatically send the results of the search query to the electronic device 310 as the server 311 determines or identifies the results. In particular, the server 311 may serially receive search results from various of the databases to which the server 311 interfaces, and may in turn send the search results to the electronic device 310.

The electronic device 310 may display (348) the results of the search query (i.e., the item(s) or object(s) available for sale), any notification information associated with the item(s) or object(s), and any coupon(s), discount(s), review(s), rating(s), or contextual information. In embodiments, the electronic device 310 may display the notification information via a user interface or other type of display device, where the customer may interface with the displayed content to view certain notification information, make selections, and/or facilitate other functionalities. It should be appreciated that the electronic device 310 may display the information using any ordering technique or convention. For example, the electronic device 310 may prioritize, in the display, coupons that are specific to the premise identified in (340) (e.g., by highlighting these coupons), as compared to coupons that may be accepted at additional retail locations. In some implementations, the premise may offer various sponsored objects or otherwise objects that may be promoted by a manufacturer or distributor, in which case the electronic device 310 may prioritize the sponsored objects (e.g., by displaying these objects at the top of a list).

It should be further appreciated that the electronic device 310 may display various combinations and types of information. For example, the electronic device 310 may display prices for the items or objects (which may be specific to the premise), along with descriptions associated with the items or objects, coupons, discounts, reviews, ratings, and/or other contextual information.

In some implementations, the electronic device 310 may dynamically update the displayed information, such as if the electronic device 310 receives new or updated search results from the server 311. For example, after initially sending the notification information in (346), the server 311 may identify or generate a coupon associated with an identified object, and send the coupon to the electronic device 310, where the electronic device 310 may update the display to indicate the coupon. For further example, the electronic device 310 may dynamically update a review for a particular object, such as if another customer posted a review for the particular object. Further, for example, the electronic device 310 may dynamically update the display to indicate new or updated search results as they are received from the server 311. In embodiments, the electronic device 310 may re-prioritize the display based on various priority rules, more relevant prices, discounts, ratings, or other metrics. It should be appreciated that the electronic device 310 may dynamically update the displayed information in other various ways.

The electronic device 310 may receive (350) a selection of a displayed object. In particular, the user may directly select the object via the user interface. The electronic device 310 may display (352) any notification information associated with the object. According to embodiments, the electronic device 310 may display image(s) of the object, a price for the object (which may be specific to the premise), a description associated with the item, a coupon or review of the object, a rating or review of the object, and/or other contextual information. For example, the electronic device 310 may receive (354) a selection of a coupon, such as a coupon displayed in a user interface and/or associated with an item displayed in the user interface, a review, a rating, and/or other contextual information. In particular, the customer may select to redeem the coupon or view a review, rating, and/or other contextual information. In response to receiving the selection of the coupon, the electronic device 310 may update (356) account information of the customer to reflect the selected coupon, review, rating, and/or other contextual information. For example, when the customer checks out at a point of sale (POS) terminal and enters his/her account identification (e.g., an account number), the discount associated with the coupon may be applied to the transaction. As another example, a viewing history of the rating, and/or other contextual information may be logged. Accordingly, the customer is afforded an efficient and effective way to select coupons, reviews, ratings, and/or contextual information for a retail object.

Figures 4, 5:
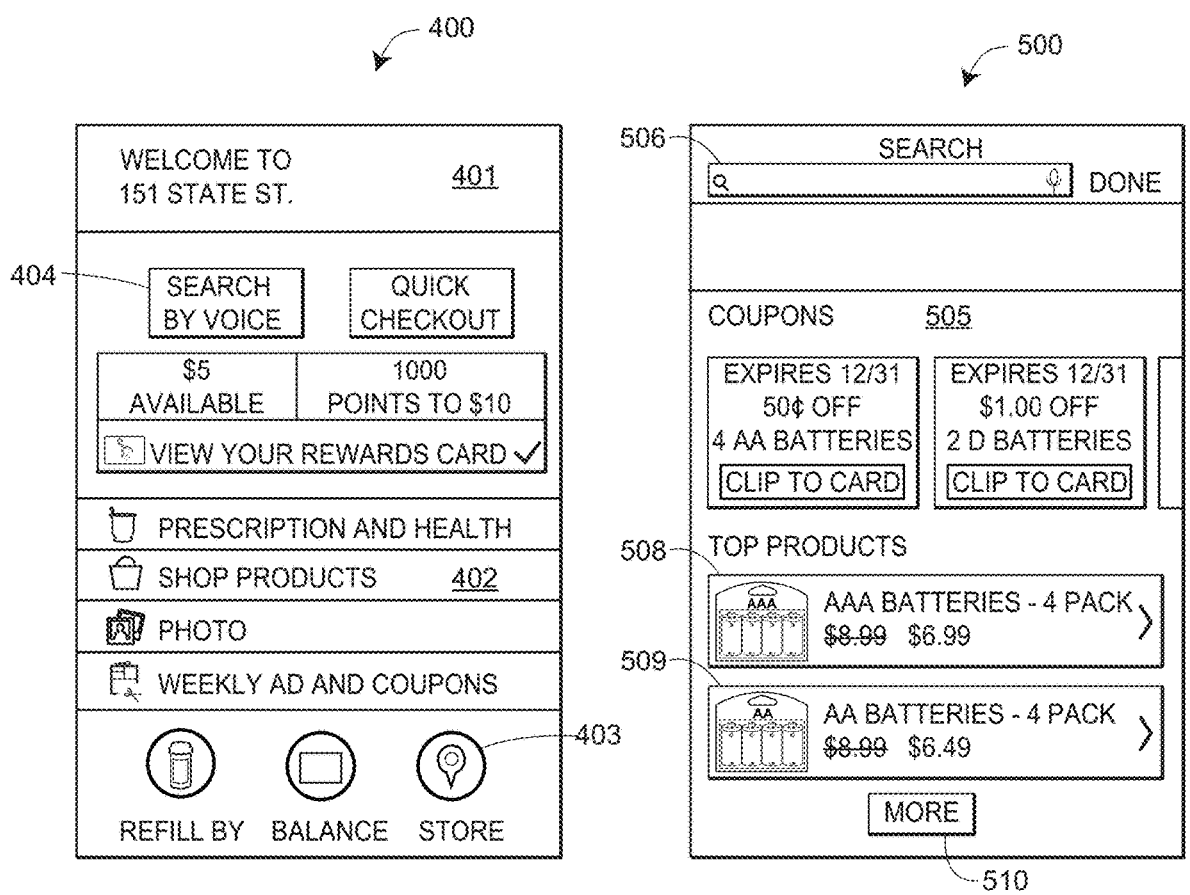
FIGS. 4-5 depict exemplary user interfaces associated with an application that supports search queries, in accordance with some embodiments.

FIGS. 4-5 depict example interfaces associated with the described embodiments. An electronic device (such as the electronic device 310 as described with respect to FIG. 3) may be configured to display the example interfaces via a user interface. In an implementation, the example interfaces may be associated with a dedicated application, for example an application offered for download by a retail chain. Each of the example interfaces may enable a customer of the electronic device to make selections, input data or information, and generally facilitate operation of the functionalities indicated in the example interfaces. It should be appreciated that the graphical content of the example interfaces is exemplary, and that the example interfaces may include alternate, additional, and fewer graphical content.

FIG. 4 depicts an example interface 400 that depicts various functionalities that may be facilitated by a customer of the electronic device. For example, as shown in FIG. 4, the functionalities may include viewing prescription and health data, shopping for objects, ordering photos, browsing a weekly ad and coupons, viewing refill information, and viewing rewards card information.

The interface 400 may indicate a premise 401 (e.g., by displaying an address of the premise 401) that may be in proximity to the electronic device, such as if the electronic device is located within the premise 401, or if the premise 401 is the store location closest to the electronic device. As discussed herein, the electronic device may identify the premise 401 via hyper-local location techniques. The interface 400 may include a store selection 403 that may enable the customer to select another premise location.

According to embodiments, the interface 400 may enable the customer to facilitate search functionalities. In particular, the electronic device may receive, retrieve, generate, or interpret object capture information (e.g., image data, video data, or augmented reality data) from an object capture by the customer of the electronic device, whereby the customer may capture the object using multiple techniques, such as via a viewfinder or a microphone. As shown in FIG. 4, the interface 400 may include a search by shop objects selection 402 and/or voice selection 404 selection. If the user selects the shop objects selection 402, the electronic device may enable the user to take a picture, video, or even capture augmented reality data of the object (e.g., when the customer opens a viewfinder focused on the object but does not actually capture a still or video of the object) for the electric device to then determine the object capture information. If the user selects the search by voice selection 404, the electronic device may record audio and analyze the audio using a voice recognition technique to determine the object capture information. The electronic device may also support scanning or capturing a code, identification, or the like associated with a particular object.

After determining the object capture information, electronic device may execute a search query according to the object capture information to identify relevant items or objects available for sale within the premise 401. Such execution of the search query involves an application of the electronic device (e.g., application 118) sending object capture information and its location to the server (e.g., server 202), the server application 238 of server 202 evaluating and identifying a retail object based on the object capture information and location, and the server application 238 providing the results back to the electronic device.

FIG. 5 illustrates an interface 500 associated with executing a search query and displaying the notification information associated with a selected object. The interface 500 may include a prompt 506 for the customer to provide an image, video, or augmented reality capture of an object. For example, the customer may have already captured an image of AAA batteries using the viewfinder, via the objects selection 402 (or another technique), that is stored in memory, and the prompt 506 may allow the customer to retrieve the image from memory. The interface 500 may include a set of coupons 505 for objects that correspond to the search query. Each of the coupons 505 includes a "clip to card" selection that enables the customer to associate the selected coupon with an account of the customer. Although not pictured, the interface 500 may also include reviews, ratings, and/or other contextual information associated with the object as described herein. Accordingly, the customer may read pertinent reviews written by other customers who have purchased or used the object.

The interface 500 further includes a set of objects 508, 509 identified based on the search query. As shown in FIG. 5, the object 508 is a pack of four AAA batteries and the object 509 is a back of four AA batteries. Each of the objects 508, 509 indicates a price that corresponds to the price of the object within the premise. It should be appreciated that the displayed price may be different from (or the same as) the price of the same object that is available at a different retail location(s). Although the set of objects includes two different objects, it is contemplated that the interface 500 includes a set of a single object or more than two different objects. The number of objects shown may be based on the accuracy of the computer vision model utilized by the server application 238. The interface 500 further includes a "more" selection 510 that, when selected by the customer, causes the electronic device to display any additional objects information identified from the search query. As discussed herein, the electronic device may dynamically update the interface 500 as the electronic device receives additional search results, such as additional objects and/or additional coupons, discounts, reviews, ratings, or other contextual information.

Figure 6:
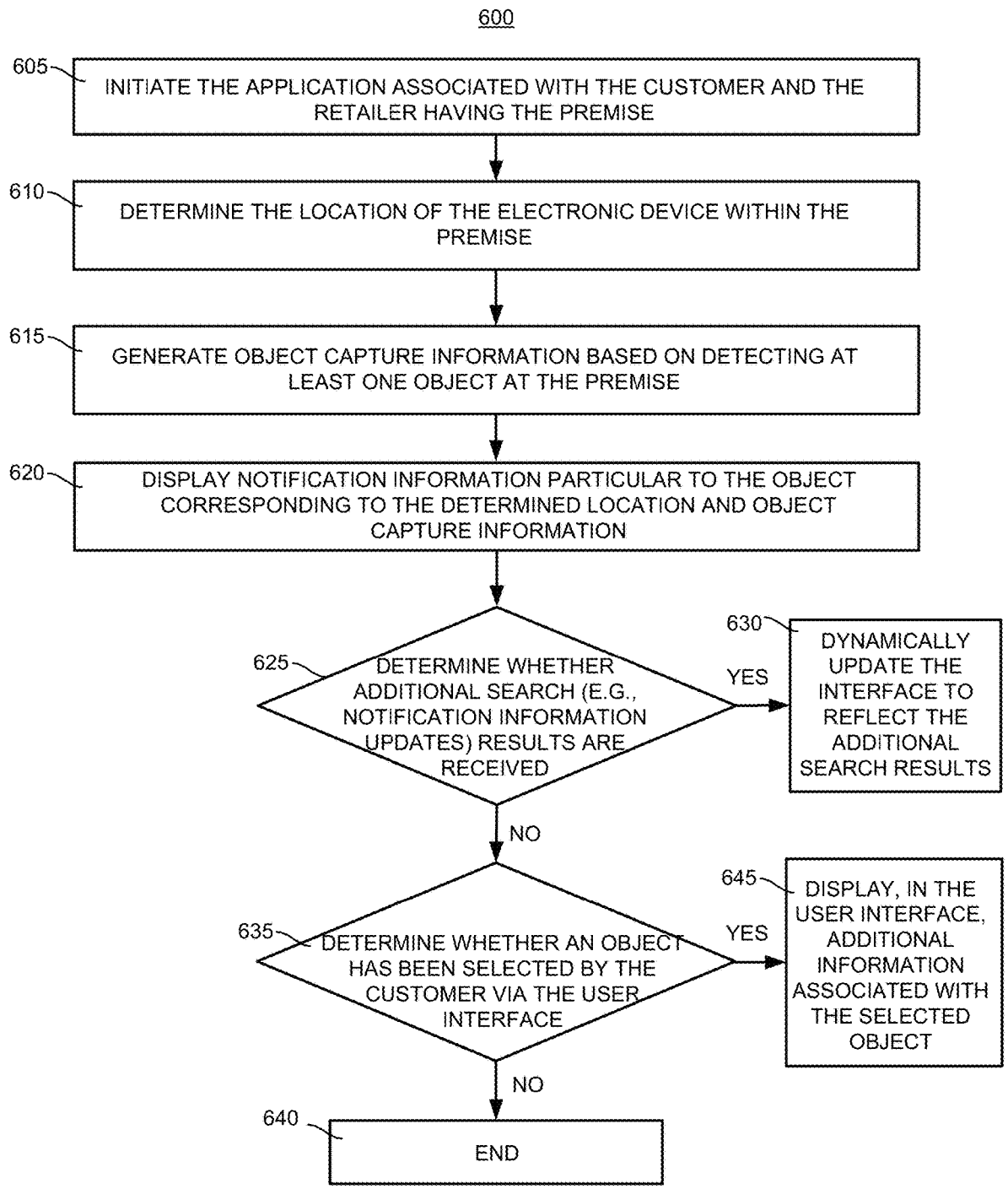
FIG. 6 depicts a flow chart of an example method for providing information relevant to objects available for sale within a premise using hyper-local location techniques, in accordance with some embodiments.

FIG. 6 is a flow chart of an example method 600 of improving a shopping experience within a premise using hyper-local location techniques. The method 600 may be performed by an electronic device that supports an application associated with the premise. The electronic device may be configured to communicate with a server, such as a backend server or a server within the premise. It should be appreciated that the method 600 is merely exemplary and may include alternative or additional functionalities.

The method 600 may begin when the electronic device (e.g., via a processor) initiates the application associated with the customer and the retailer having the premise, as shown in block 605. In embodiments, a customer of the electronic device may select to initiate the application, or the electronic device may automatically initiate the application in response to a certain trigger (e.g., connecting to an in-store network). The electronic device may determine (e.g. via a sensor) the location of the electronic device within the premise, as shown in block 610. In some embodiments, the electronic device may indicate the location to the customer, such as via a user interface of the application. In an implementation, the electronic device may connect to an in-store transmitter (e.g., a Bluetooth beacon) or an in-store network and may identify the premise based on the connection. In another implementation, the electronic device may determine its location (e.g., via a location module), and the server (or the electronic device) may identify the premise based on the determined location.

The electronic device may generate (e.g., via a processor) object capture information based on detecting at least one object at the premise, as shown in block 615. In embodiments, the electronic device may generate the object capture information via one or more techniques, such as via an image, video, or augmented reality capture of a retail object from the customer, by a viewfinder scanning the retail object. As described above, the electronic device may generate the object capture information via other techniques, such as via voice recognition using a microphone of the electronic device, or a scan of a unique object identifier or other type of code using the viewfinder. The electronic device may display (e.g., via a user interface) notification information particular to the retail object corresponding to the determined location and object capture information, as shown in block 620. The notification information may be received from a server subsequent to the electronic device sending the determined location and object capture information to the server. To generate the notification information, the server may be configured to execute a search query according to the determined location and object capture information. The results of the search (i.e., the notification information) may include an indication of the identity of at least one object, the price, a coupon or discount, a rating or review, or any contextual information pertaining to the object.

The electronic device may further determine whether additional search results are received (i.e., whether the server has identified additional search results or notification information updates), as shown in block 625. If the electronic device does not receive additional search results ("NO"), processing may proceed to block 635. If the electronic device receives additional search results ("YES"), the electronic device may dynamically update the interface to reflect the additional search results, as shown in block 630. According to embodiments, the electronic device may display any additional objects and notification information relating thereto, any additional coupons, and/or the like. Further, the electronic device may prioritize certain objects according to a set of rules or other constraints.

At block 635, the electronic device may determine whether an object has been selected, for example by the customer via the user interface. If an object has not been selected ("NO"), processing may end or proceed to other functionality, as shown in block 640. If an object has been selected ("YES"), the electronic device may display, in the user interface, additional information associated with the selected object, as shown in block 645. In embodiments, the additional information may be included in the notification information displayed in block 620, and/or may be other information.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed:

1. A computer-implemented method in an electronic device, the method comprising:
    initiating, by a processor, an application on the electronic device, the application associated with a customer and with a retailer that has at least one physical premise;
    determining, by the processor, a location of the electronic device within the physical premise based on one or more sensors of the electronic device;
    generating, by the processor, object capture information based on detecting at least one object at the physical premise by a viewfinder of the electronic device;
    displaying, on an interface associated with the electronic device and with the application, notification information particular to the at least one object corresponding to the location of the electronic device within the physical premise and the object capture information, the notification information including at least one of:
    an identity of the at least one object at the physical premise,
    a price of the at least one object at the physical premise,
    a coupon or discount for the at least one object at the physical premise,
    a rating or review of the at least one object at the physical premise, or
    contextual information of the at least one object at the physical premise.

2. The computer-implemented method of claim 1, further including:
    sending, to one or more servers, the location of the electronic device and the object capture information; and
    receiving, from the one or more servers, at least some of the notification information particular to the at least one object at the physical premise,
    wherein displaying the notification information particular to the at least one object at the physical premise comprises automatically displaying the at least some of the notification information particular to the at least one object at the physical premise upon receiving the at least some of the notification information particular to the at least one object at the physical premise.

3. The computer-implemented method of claim 2, wherein the sending of the location of the electronic device and the object capture information comprises sending each of the location of the electronic device and the object capture information to the one or more servers simultaneously or sequentially.

4. The computer-implemented method of claim 2, wherein the sending of the location of the electronic device and the object capture information comprises:
- embedding the location of the electronic device within a metadata field of the object capture information; and
- sending the object capture information having the location of the electronic device embedded within to the one or more servers.

5. The computer-implemented method of claim 1, wherein the determining of the location of the electronic device based on one or more sensors of the electronic device comprises:
- receiving a short-range communication signal from a beacon located at the at least one physical premise; and
- determining the location of the electronic device based on a location identifier embedded in the short-range communication signal.

6. The computer-implemented method of claim 1, wherein the object capture information comprises at least one of image data, video data, or augmented reality data.

7. An electronic device comprising:
- one or more transceivers configured to communicatively connect with one or more servers associated with a retailer having at least one physical premise;
- a user interface configured to display content;
- one or more sensors configured to determine information indicative of a location of the electronic device;
- a viewfinder configured to detect at least one object at the physical premise;
- a memory storing an application that is electronically associated with the retailer and with a customer; and
- a processor interfacing with the one or more transceivers, the user interface, the one or more sensors, the viewfinder, and the memory, and configured to:
  - initiate the application associated with the retailer and the customer;
  - determine, based on information determined by the one or more sensors, the location of the electronic device within the physical premise;
  - generate, based on detecting the at least one object at the physical premise by the viewfinder, object capture information; and
  - cause the user interface to display, via the application, notification information particular to the at least one object corresponding to the location of the electronic device within the physical premise and the object capture information, the notification information including at least one of:
    - an identity of the at least one object at the physical premise,
    - a price of the at least one object at the physical premise,
    - a coupon or discount for the at least one object at the physical premise,
    - a rating or review of the at least one object at the physical premise, or
    - contextual information of the at least one object at the physical premise.

8. The electronic device of claim 7, wherein the processor is further configured to:
- send, to the one or more servers via the one or more transceivers, the location of the electronic device and the object capture information,
- receive, from the one or more servers via the one or more transceivers, at least some of the notification information particular to the at least one object at the physical premise, and
- cause the user interface to automatically display, via the application, the at least some of the notification information particular to the at least one object at the physical premise upon receiving the at least some of the notification information particular to the at least one object at the physical premise.

9. The electronic device of claim 8, wherein to send the location of the electronic device and the object capture information, the processor is further configured to send each of the location of the electronic device and the object capture information to the one or more servers simultaneously or sequentially.

10. The electronic device of claim 8, wherein to send the location of the electronic device and the object capture information, the processor is further configured to:
- embed the location of the electronic device within a metadata field of the object capture information; and
- send the object capture information having the location of the electronic device embedded within to the one or more servers.

11. The electronic device of claim 7, wherein to determine the location of the electronic device based on information determined by the one or more sensors, the processor is further configured to:
- receive a short-range communication signal from a beacon located at the at least one physical premise; and
- determine the location of the electronic device based on a location identifier embedded in the short-range communication signal.

12. The electronic device of claim 7, wherein the object capture information comprises at least one of image data, video data, or augmented reality data.

13. A system, comprising:
- a data storage device storing object identification information corresponding to at least one object associated with a retailer having at least one physical premise;
- a communicative interface to an application executing on an electronic device, the application associated with the retailer and a customer; and
- one or more processors interfacing with the data storage device, and the communicative interface, and configured to:
  - receive, from the application, location information of the electronic device within the physical premise based on one or more sensors of the electronic device;
  - determine the location of the electronic device based on a location identifier embedded in the location information;
  - receive, from the application, object capture information based on detecting the at least one object at the physical premise by a viewfinder of the electronic device;
  - facilitate a search query using the object identification information retrieved from the data storage device, the location of the electronic device within the physical premise, and the object capture information to generate notification information particular to the at least one object at the physical premise; and transmit the notification information to the application for display on a user interface of the electronic device, the notification information including at least one of:
- an identity of the at least one object at the physical premise,
- a price of the at least one object at the physical premise,
- a coupon or discount for the at least one object at the physical premise,
- a rating or review of the at least one object at the physical premise, or
- contextual information of the at least one object at the physical premise.

14. The system of claim 13, wherein the location information comprises short-range communication data provided by the electronic device in response to the electronic device receiving a short-range communication signal from a beacon located at the at least one physical premise.

15. The system of claim 13, wherein the processor is configured to receive each of the location information and the object capture information simultaneously or sequentially.

16. The system of claim 13, wherein the processor is configured to receive the location information object capture information having the location information embedded within a metadata field of the object capture information.

17. The system of claim 13, wherein the object capture information comprises at least one of image data, video data, or augmented reality data.

* * * * *